(12) United States Patent
Good

(10) Patent No.: US 7,850,476 B2
(45) Date of Patent: Dec. 14, 2010

(54) LOW PROFILE SOLAR LAMINATE CONNECTOR ASSEMBLY

(75) Inventor: Robert Scott Good, Camp Hill, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 93 days.

(21) Appl. No.: 12/260,658

(22) Filed: Oct. 29, 2008

(65) Prior Publication Data

US 2010/0105238 A1   Apr. 29, 2010

(51) Int. Cl.
*H01R 13/627* (2006.01)

(52) U.S. Cl. .................. 439/358; 439/352; 439/923; 136/251

(58) Field of Classification Search .......... 439/358, 439/352, 923, 353, 251; 136/251
See application file for complete search history.

(56) References Cited

U.S. PATENT DOCUMENTS

| | | | |
|---|---|---|---|
| 4,310,211 A | | 1/1982 | Bunnell et al. |
| 4,460,232 A | | 7/1984 | Sotolongo |
| 4,468,076 A | * | 8/1984 | Hine et al. ............ 439/368 |
| 4,687,266 A | | 8/1987 | Tanii et al. |
| 5,277,627 A | * | 1/1994 | Matsuzaki ............ 439/677 |
| 5,797,771 A | * | 8/1998 | Garside ............ 439/607.46 |
| 6,056,578 A | * | 5/2000 | Lin ............ 439/358 |
| 6,093,884 A | | 7/2000 | Toyomura et al. |
| 6,196,871 B1 | * | 3/2001 | Szu ............ 439/571 |
| 6,337,436 B1 | | 1/2002 | Ganz |
| 6,375,487 B1 | * | 4/2002 | Tennessen ............ 439/373 |
| 6,437,236 B2 | | 8/2002 | Watanabe et al. |
| 6,606,830 B2 | | 8/2003 | Nagao et al. |
| 6,676,459 B2 | | 1/2004 | Mukai et al. |
| 6,840,799 B2 | * | 1/2005 | Yoshikawa et al. ...... 439/502 |
| 7,014,490 B1 | * | 3/2006 | Morikawa et al. ...... 439/352 |
| 2004/0092186 A1 | * | 5/2004 | Wilson-Nguyen et al. ... 442/181 |
| 2006/0019526 A1 | * | 1/2006 | Jeon ............ 439/358 |
| 2007/0287322 A1 | | 12/2007 | Machado et al. |
| 2008/0160819 A1 | * | 7/2008 | Daily et al. ............ 439/358 |
| 2009/0318004 A1 | * | 12/2009 | Cours ............ 439/304 |

FOREIGN PATENT DOCUMENTS

| | | |
|---|---|---|
| GR | 1004980 B1 | 9/2005 |
| WO | 2004017466 A2 | 2/2004 |
| WO | 2007136569 A2 | 11/2007 |

* cited by examiner

*Primary Examiner*—Hae Moon Hyeon

(57) ABSTRACT

A low profile photovoltaic (PV) connector for placement in space restricted areas. The connector includes a plug and receptacle for interconnecting PV solar arrays. The receptacle is mechanically secured to a solar array. The mechanical connection between the receptacle and the solar array may be a staking process (e.g., ultrasonic, heat). The plug and receptacle may be locking, where only an extraction tool or other similar device may remove the plug from the receptacle. The plug and receptacle may also be non-locking.

17 Claims, 5 Drawing Sheets

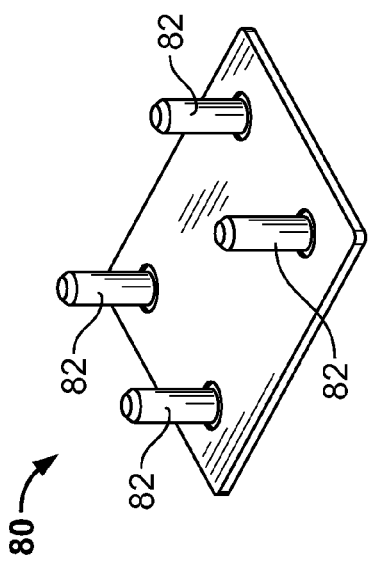
FIG. 8
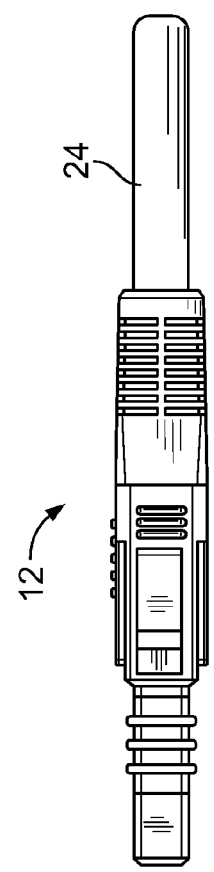
FIG. 9
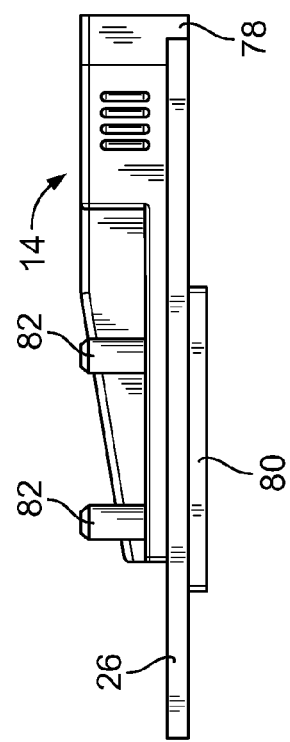

LOW PROFILE SOLAR LAMINATE CONNECTOR ASSEMBLY

FIELD OF THE INVENTION

The present invention is directed to a connector for photovoltaic (PV) systems, and more particularly to a low profile photovoltaic (LPPV) solar laminate connector.

BACKGROUND OF THE INVENTION

Photovoltaic (PV) modules, or PV arrays, produce electricity from solar energy. Electrical power produced by PV modules reduces the amount of energy required from non-renewable resources such as fossil fuels and nuclear energy. Significant environmental benefits are also realized from solar energy production, for example, reduction in air pollution from burning fossil fuels, reduction in water and land use from power generation plants, and reduction in the storage of waste byproducts. Solar energy produces no noise, and has few moving components. Because of their reliability, PV modules also reduce the cost of residential and commercial power to consumers.

PV cells are essentially large-area semiconductor diodes. Due to the photovoltaic effect, the energy of photons is converted into electrical power within a PV cell when the PV cell is irradiated by a light source such as sunlight. PV cells are typically interconnected into solar modules that have power ranges of up to 100 watts (W) or greater. For large PV systems, special PV modules are manufactured with a typical power range of up to several hundred watts. A PV module is the basic element of a (PV) power generation system. A PV module has many solar cells interconnected in series or parallel, according to the desired voltage and current parameters. PV cells are connected and placed between a polyvinyl plate on the bottom and a tempered glass on the top. PV cells are interconnected with thin contacts on the upper side of the semiconductor material. The typical crystalline modules power ranges from several watts to two hundred watts per module.

In the case of facade or roof systems, the PV system may be installed during construction or added to the building after it is built. Roof systems are generally lower powered systems, e.g., 10 kW, to meet typical residential loads. Roof-integrated PV systems may consist of different module types, such as crystalline and micro-perforated amorphous modules. Roof-integrated PV systems are integrated into the roof such that the entire roof or a portion thereof is covered with PV modules, or they are added to the roof later. PV cells may be integrated with roof tiles or shingles.

PV modules or arrays require specially designed devices adapted for interconnecting the various PV modules with each other, and with electrical power distribution systems. PV connection systems are used to accommodate serial and parallel connection of PV arrays. In addition to connection boxes, a PV connection system includes connectors that allow for speedy field installation or high-speed manufacture of made-to-length cable assemblies. Connectors or connection boxes may be required to receive specialized cable terminations from PV modules, with power diodes inside for controlling current flow to the load. PV modules may be required in areas with tight space restraints and requirements, requiring the size of the PV module to be minimized. Patent application Ser. No. 11/865,883 entitled "LOW PROFILE PHOTOVOLTAIC (LPPV) BOX", filed on Oct. 2, 2007, describes an LPPV junction box for use with PV modules/arrays. In addition, patent application Ser. No. 12/144,085 entitled "LOW PROFILE PHOTOVOLTAIC CONNECTOR", filed on Jun. 23, 2008 describes an LPPV connector for use with PV modules/arrays.

Therefore, there is a need for an LPPV connector that mounts to a PV array mechanically and provides a low profile connection to the PV arrays.

SUMMARY OF THE INVENTION

The present invention is directed to a low profile connector including a plug and a receptacle. The plug includes a plug body, a male connection and a cable. The receptacle includes a receptacle body and a receiver. The receptacle is secured in electrical contact with a solar array. The plug mates with the receptacle to form an electrical connection and the plug and the receptacle have a vertical profile at least equal to a width of the cable.

Another embodiment of the present invention includes a low profile connector including a plug and a receptacle. The plug has a plug body, a male connection and a cable and the receptacle has a receptacle body and a receiver. The receptacle is secured to a solar array through a staking process. The plug mates with the receptacle to form an electrical connection and the plug and the receptacle have a vertical profile at least equal to a width of the cable.

Yet another embodiment of the present invention includes a low profile connector including at least two plugs and at least two receptacles. Each plug of the at least two plugs has a plug body, a male connection and a cable and each receptacle of the at least two receptacles has a receptacle body and a receiver. The at least two receptacles are secured in electrical contact with at least two solar arrays. The at least two plugs are connected by the cable. A first plug of the at least two plugs mates with a first receptacle of the at least two receptacles and a second plug of the at least two plugs mates with a second receptacle of the at least two receptacles. The first receptacle is secured in electrical contact with a first solar array and the second receptacle is secured in electrical contact with a second solar array. The at least two plugs and at least two receptacles are in electrical communication.

An advantage of the present invention is that the LPPV connector allows a plurality of PV solar arrays to be connected in low profile spaces.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 8 shows a perspective view of a molded cover that may be used to secure the receptacle to the solar array.

FIG. 9 shows a side view of a plug and receptacle of FIG. 7 in an unmated position.

DETAILED DESCRIPTION OF THE INVENTION

Figure 1:
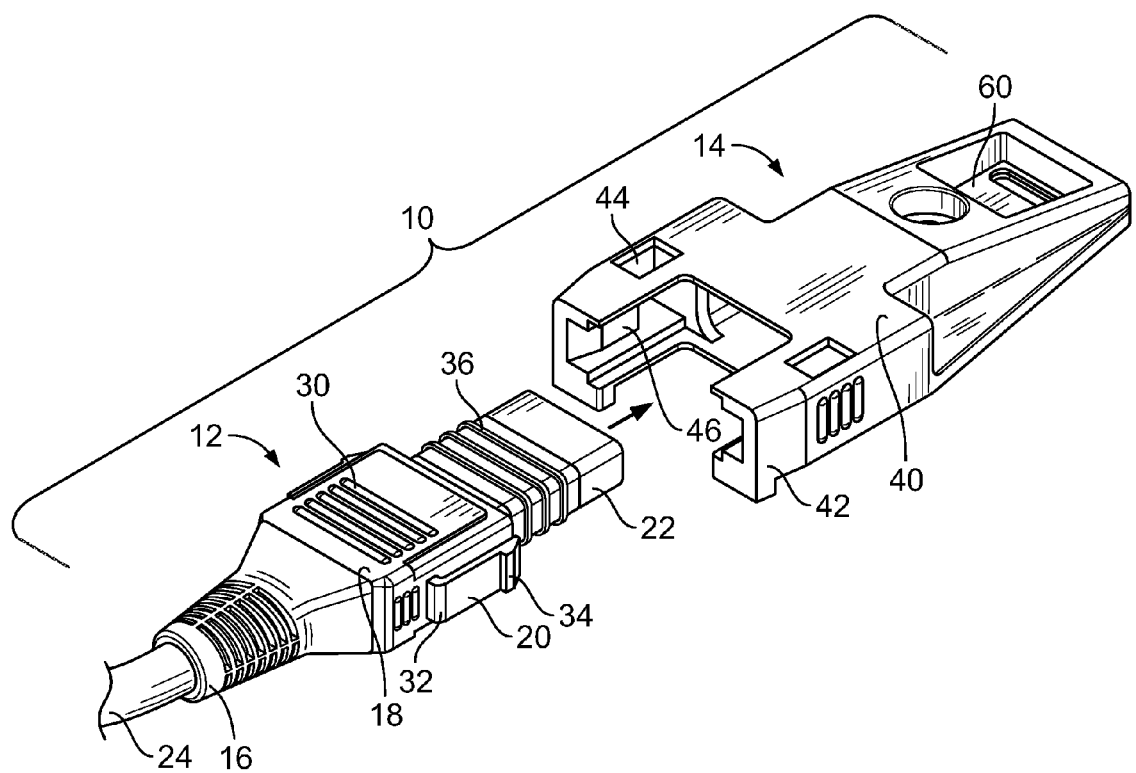
FIG. 1 shows a perspective view of a plug and receptacle of a LPPV connector in an unmated position.
Figure 2:
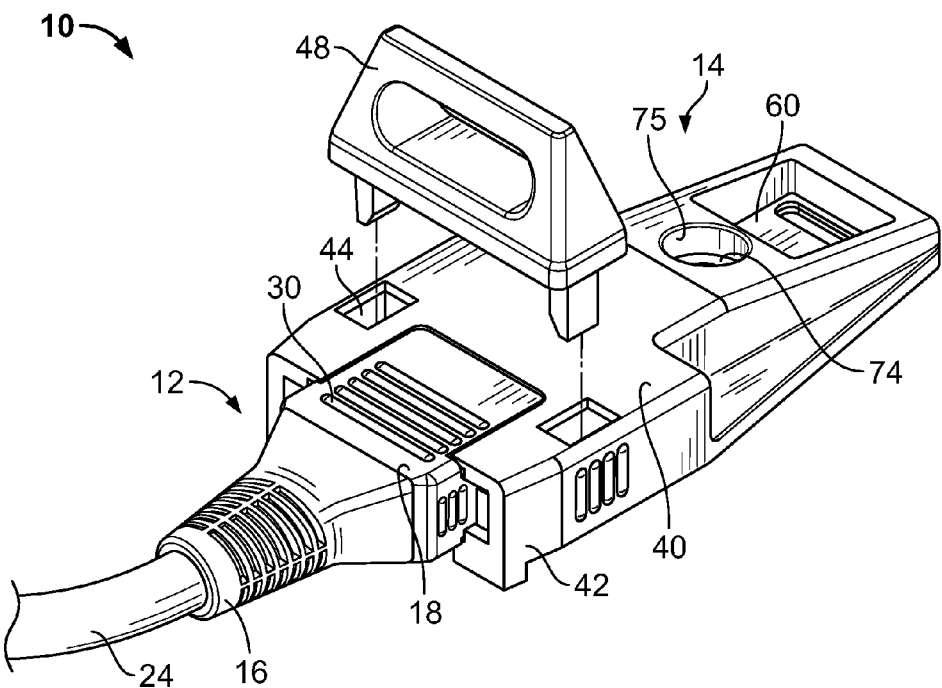
FIG. 2 shows a perspective view of the mated connector and an extraction tool.
Figure 3:
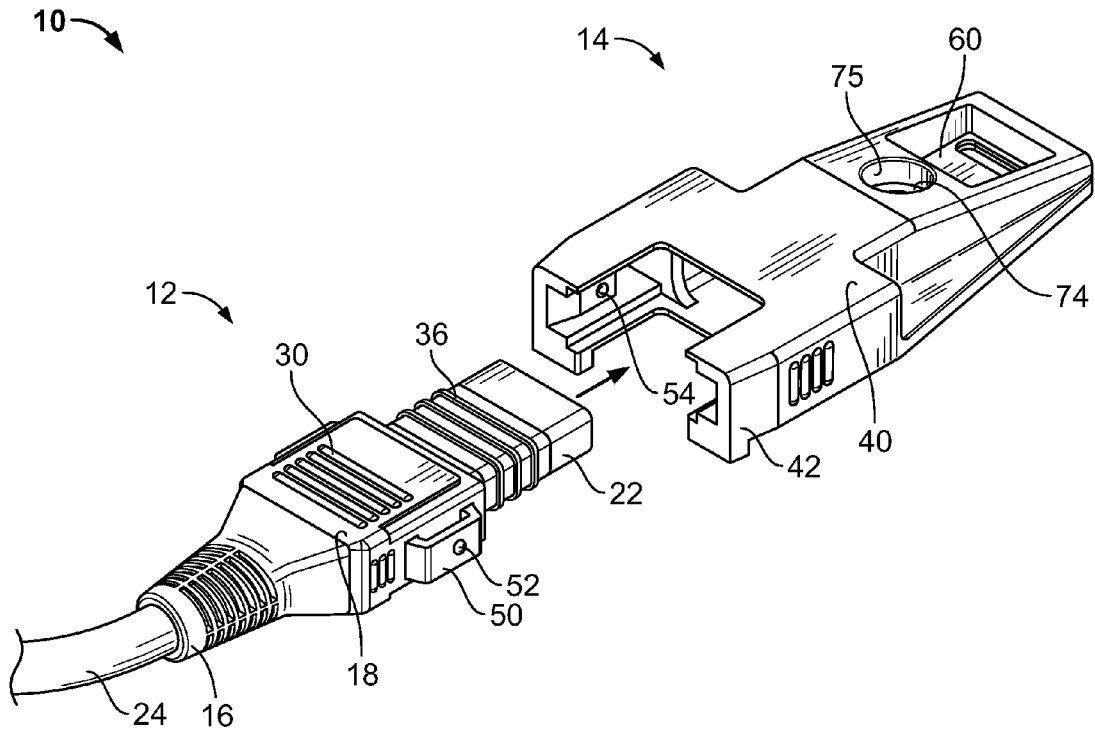
FIG. 3 shows a perspective view of a plug and receptacle of a non-locking LPPV connector in an unmated position.

FIGS. 1-3 show a low profile Photovoltaic (LPPV) connector 10. Connector 10 has a plug 12 and a receptacle 14 that are mateable to form an electrical connection. Plug 12 includes a strain relief 16 for securing a conductive cable 24 to a body 18, locking latches 20 projecting from both sides of body 18, and a male connection 22 at the forward end of body 18. Strain relief 16 provides a waterproof seal and relieves strain caused by pulling and bending of a cable 24 that extends from plug 12. Cable 24 conducts power from a solar array 26 (see FIG. 5), to plug 12. Cable 24 may be any suitable cable having any suitable diameter for electrical communication. For example, cable 24 may be an 18 American Wire Gauge (AWG) cable to a 10 AWG cable, and may communicate power or data from any source to plug 12 or receptacle 14. Plug 12 has a vertical profile that is at least equal to the diameter of cable 24. Plug 12 may have a vertical profile that is at least slightly larger than the diameter of cable 24, e.g. plug 12 has a vertical diameter that is 0.5 mm greater than cable 24. Strain relief 16 may be manufactured from a flexible and sturdy material such as Santoprene® rubber, or any other suitable material.

Plug body 18 extends from strain relief 16, and is manufactured from a rigid plastic material or any other suitable material. Plug 12 may be formed by an overmolding process or any other suitable manufacturing process. Disposed inside plug body 18 is a contact, or blade terminal 28 (see e.g. FIG. 6) for facilitating an electrical connection with receptacle 14. Blade terminal 28 may be a FASTON terminal or any other suitable blade or contact. Plug body 18 may also include a grip 30 on the top surface to provide a non-slippery surface for a user to grasp plug 12. Grip 30 may be molded from the same material, or grip 30 may be molded from the same flexible material as strain relief 16. Disposed on both sides of body 18 are locking latches 20. Locking latches 20 extend from plug body 18 and bend at an elbow 32 to extend substantially parallel to body 18. Locking latches 20 have protrusions 34 at the distal end of latch 20. Protrusions 34 engage with receptacle 14 when plug 12 is mated with receptacle 14.

Male connection 22 extends from body 18 and mateably connects with receptacle 14. Sealing ribs 36 are disposed on the outer surface of male connection 22. The figures show three sealing ribs 36 disposed on the outer surface of male connection 22, however any suitable number of sealing ribs 36 may be used. Sealing ribs 36 may be formed from a flexible, slightly compressible material such as Santoprene® rubber, or any other suitable material. When plug 12 is mated with receptacle 14, sealing ribs 36 are compressed against receptacle to form a seal between plug 12 and receptacle 14. Sealing ribs 36 prevent moisture, dust particles or other matter from entering connector 10.

Receptacle 14 has a receptacle body 40 and a receiver 42. Receptacle body 40 includes a solder pad 60 for contacting a conductive foil (not shown) from a solar array or solar laminate 26. The foil (not shown) is attached (e.g., soldered, welded, fastener) to solder pad 60 to create an electrical connection path between solar array 26 and receptacle 14. Conductive foil (not shown) is used to provide electrical interconnections between multiple solar arrays 26. Conductive foil (not shown) may be unitary with, or in electrical connection with solar array 26, and extend from solar array 26 to enable a connection with a junction box (not shown) or other suitable connection device. Receptacle body 40 may be manufactured from a rigid plastic material or any other suitable material. A contact, or blade terminal 28 is disposed inside receptacle body 40. The blade terminal 28 provides an electrical connection between solder pad 60 to plug 12. Blade terminal 28 may be a FASTON terminal or any other suitable blade or contact. Receptacle 14 may also include an aperture 75 (See FIG. 6) for receiving a fastener 74 or other suitable fastening device (e.g. a rivet). Fastener 74 secures receptacle 14 to solar array 26 without the use of adhesive or additional fasteners or devices.

Receiver 42 extends from receptacle body 40. Receiver 42 may be unitary with receptacle body 40 and configured to mate with male connection 22 on plug 12. At least one aperture 44 is disposed on the top surface of receiver 42. Apertures 44 are configured and disposed to align with protrusions 34 on locking latches 20 when plug 12 is mated with receptacle 14. Apertures 44 provide access to locking latches 20 when plug 12 is mated with receptacle 14. Receiver 42 also includes a ledge 46 that engages locking latch 20 when plug 12 is mated with receptacle 14. Protrusions 34 engage with ledges 46 and prevent plug 12 from easily disconnecting from receptacle 14. When locking latches 20 engage with ledges 46, an audible and/or tactile signal may be released, notifying the user that plug 12 has been secured in receptacle 14.

As shown in FIG. 2, to disengage locking latches 20 from ledges 46, an extraction tool 48 may be used. Extraction tool 48 is configured to extend into apertures 44 in contact with protrusions 34 thereby displacing locking latches 20. When extraction tool 48 displaces locking latches 20, elbow 32 permits movement of locking latches 20 to disengage protrusions 34 from ledges 46. Plug 12 may be disconnected from receptacle 14 when extraction tool 48 has disengaged locking latches 20 from ledges 46. Both plug 12 and receptacle 14 of connector 10 are configured to a maximum height of 8 mm. However, connector 10 may be configured to any suitable height requirement, for a low profile connector.

Figure 4:
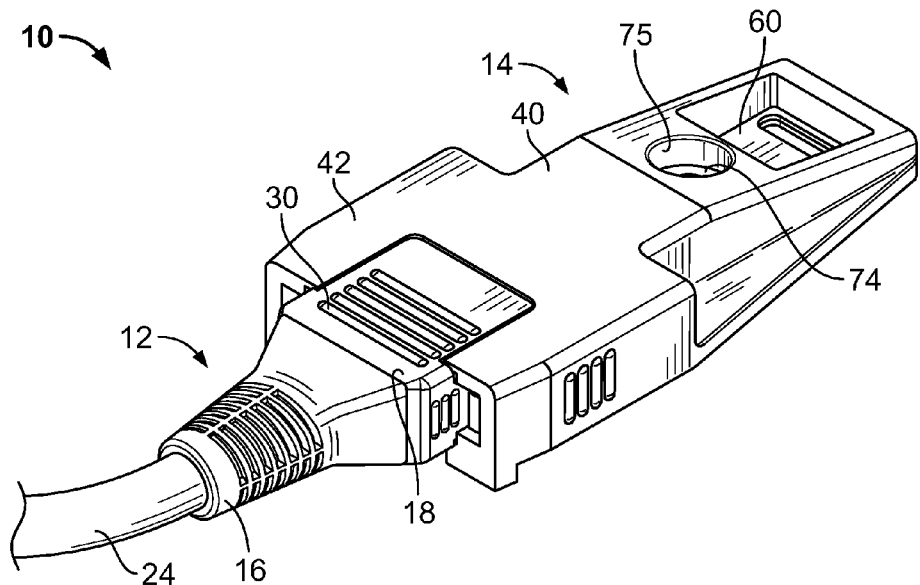
FIG. 4 shows a perspective view of a plug and receptacle of a non-locking LPPV connector in a mated position.

In an alternate embodiment shown in FIGS. 3 and 4, plug 12 may include at least one locking latch 50. Locking latch 50 projects from body 18 of plug 12 and has a raised portion 52. Locking latch 50 is deformable, as plug 12 is mated with receptacle 14, locking latch 50 may be displaced inward toward body 18 until raised portion 52 engages with cavity 54 in receiver 42 in receptacle 14. When locking latches 50 engage with receiver 42, an audible and/or tactile signal may be released that notifies the user that plug 12 has been secured in receptacle 14. Once plug 12 is mated with receptacle 14, plug 12 may be removed from receptacle 14 without the aid of a tool or other device. A normal force of greater than 20 lbs. may be applied to plug 12, receptacle 14, or both substantially simultaneously to remove plug 12 from receptacle 14. Receptacle body 40 does not include apertures 44 (See, e.g. FIG. 1).

Figure 5:
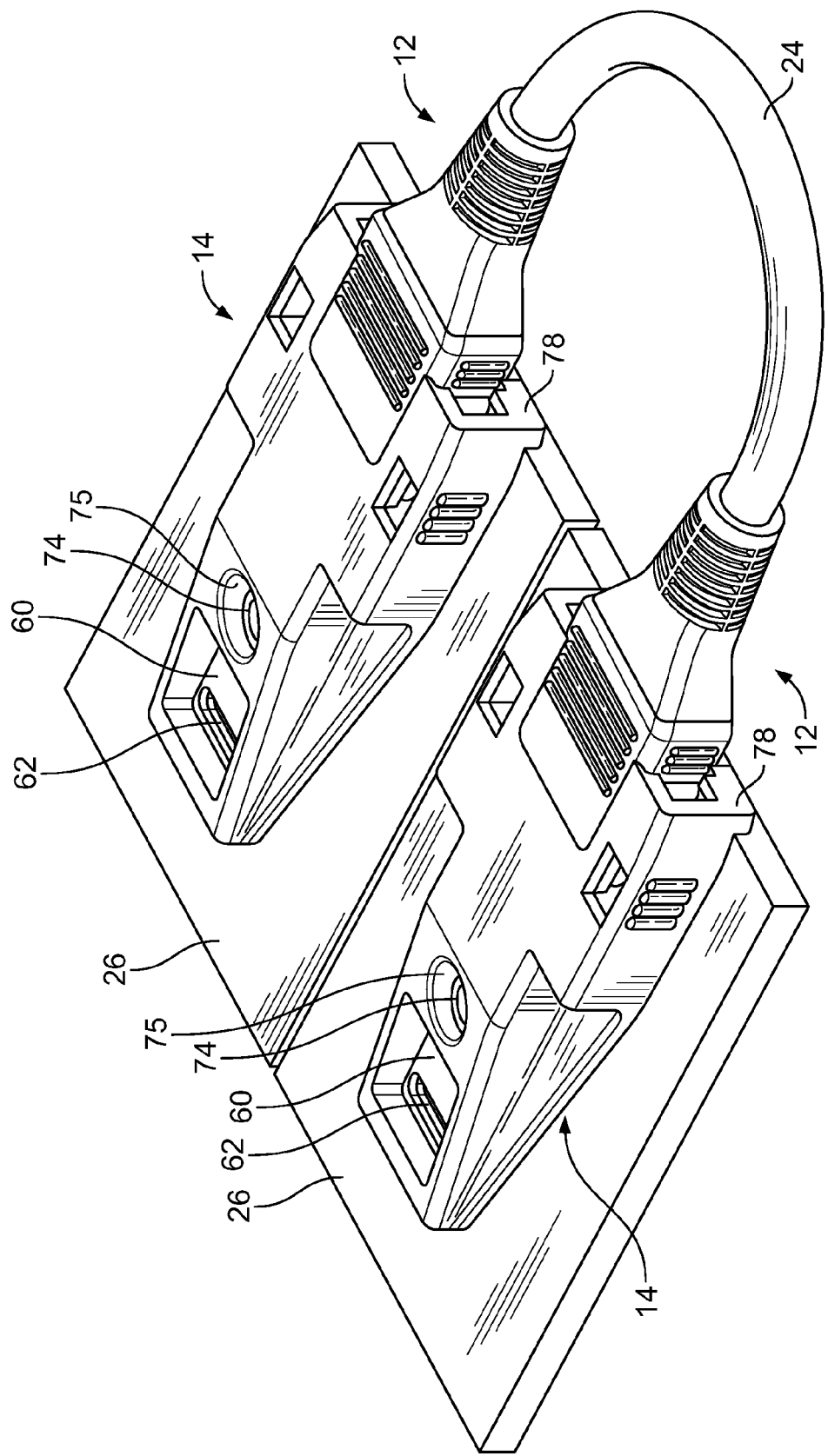
FIG. 5 shows perspective view of two plugs and two receptacles of a LPPV connector in FIG. 1 in a mated position.

FIG. 5 shows two plugs 12 in electrical connection through a cable 24 and mateable with receptacles 14. Each receptacle 14 is mechanically secured to solar array 26. Receptacle 14 is mechanically secured to solar array 26 with a fastener 74 or other similar fastening device. Receptacle 14 is disposed on solar array 26 such that a conductive foil (not shown) on solar array 26 contacts solder pad 60. Solder pad 60 has a slot 62 for allowing the foil (not shown) to extend through and attaching (e.g., soldering, welding, mechanical fastening) solder pad 60 to foil (not shown). Once a solder connection has been made between foil (not shown) and solder pad 60, an epoxy or other seal or filling (not shown) is applied to solder pad 60. The epoxy (not shown) prevents damage or external objects or elements from damaging solder pad 60 and from damaging the connection between solder pad 60 and foil (not shown).

Figure 6:
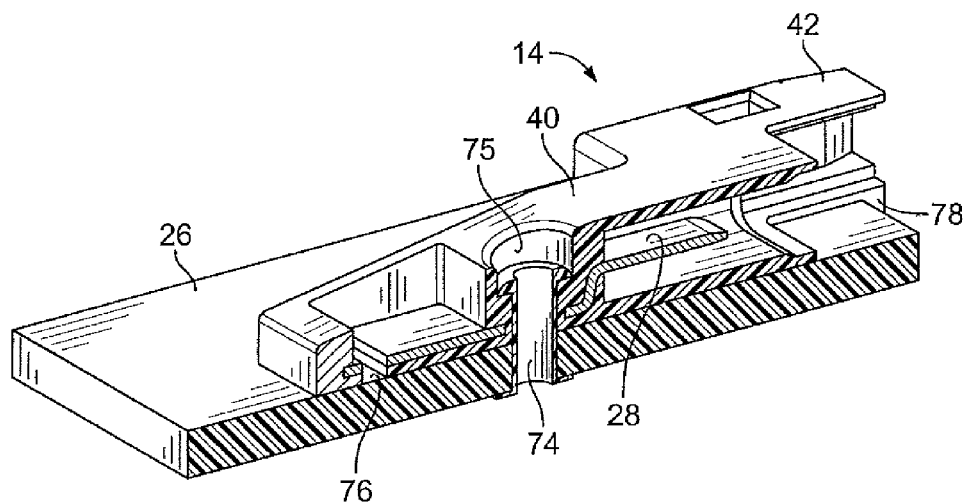
FIG. 6 shows a cross sectional view of a receptacle in FIG. 1.

FIG. 6 shows a cross section view of receptacle 14 and solar array 26. Receptacle 14 may be overmolded with a plastic material and includes blade terminal 28 for electrical connection with plug 12. Fastener 74 secures receptacle 14 to solar array 26. Receptacle body 40 partially covers the bottom surface of solder pad 60 and includes an aperture 76 for providing access for conductive foil (not shown) to contact solder pad 60. Foil (not shown) and solder pad 60 may be attached (e.g., soldered, welded, fastener) to form an electrical connection. Referring back to FIG. 5 and partially shown in FIG. 6, receptacle 14 also includes an edge extension 78 that provides positioning assurance for receptacle 14 on solar array 26. Edge extension 78 ensures that receptacle 14 is aligned on solar array 26 and positioned to provide a secure connection between solder pad 60 and foil (not shown).

Figure 7:
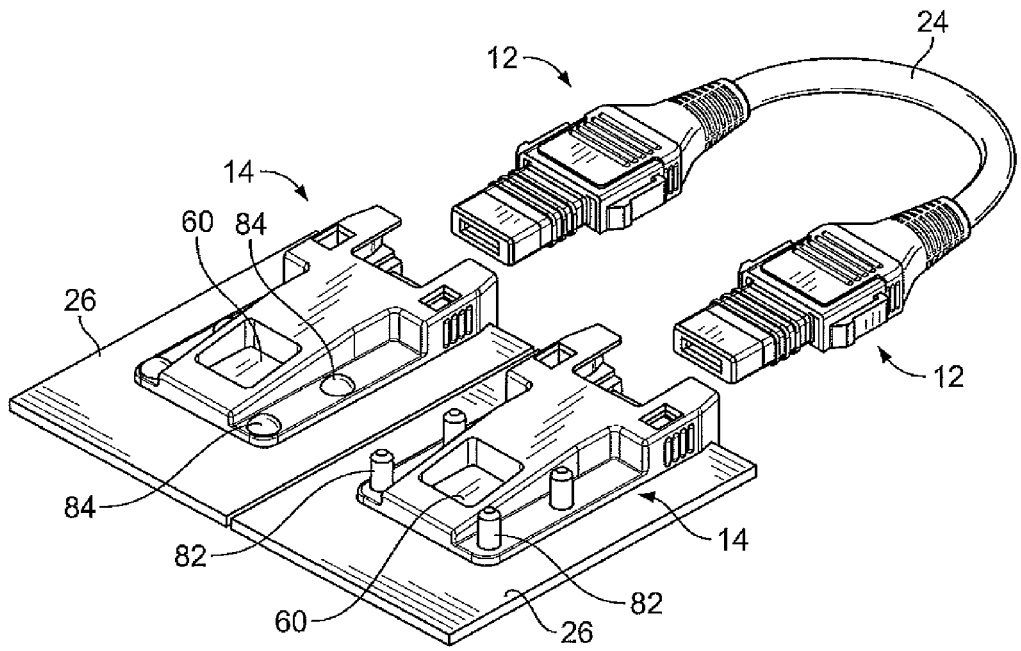
FIG. 7 shows perspective view of two plugs and two receptacles of a LPPV connector in an unmated position.

In another alternate embodiment shown in FIGS. 7, 8 and 9, receptacle 14 is mechanically secured to solar laminate 26 with a molded cover 80. Receptacle 14 is disposed on solar array 26 such that a conductive foil (not shown) on solar array 26 contacts solder pad 60. Solder pad 60 has a slot 62 for attaching (e.g., soldering, welding, mechanical fastening) solder pad 60 to foil (not shown). Once a solder connection has been made between foil (not shown) and solder pad 60, an epoxy or other seal or filling (not shown) is applied to solder pad 60. The epoxy (not shown) prevents damage or external objects or elements from damaging solder pad 60 and from damaging the connection between solder pad 60 and foil (not shown).

Receptacle 14 is mechanically secured to solar array 26 with a cover 80. Receptacle 14 may be overmolded with plastic and includes solder pad 60 and blade terminal 28 for electrical connection with plug 12. Receptacle 14 is placed on solar array 26 and aligned with apertures (not shown) in solar array 26. Cover 80 is aligned with apertures (not shown) in solar array 26 and protrusions 82 on molded cover 80 extend through both solar array 26 and receptacle 14. A staking process (e.g., ultrasonic, heat) is applied to molded cover 80 to form caps 84 from protrusions 82 and to secure receptacle 14 to solar array 26.

Receptacle body 40 partially covers the bottom surface of solder pad 60 and includes an aperture 76 (FIG. 6) for providing access for conductive foil (not shown) to contact the top surface of solder pad 60. Foil (not shown) and solder pad 60 may be attached (e.g., soldered, welded, fastener) to form an electrical connection. Receptacle 14 also includes an edge extension 78 that provides positioning assurance for receptacle 14 on solar array 26. Edge extension 78 ensures that receptacle 14 is aligned on solar array 26 and positioned to provide a secure connection between solder pad 60 and foil (not shown).

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A low profile connector for mounting to a solar array, the connector comprising:

a plug comprising a plug body, a male connection extending from a forward end of the plug body and a cable secured to the plug body; and a receptacle comprising a receptacle body and a receiver which extends from the receptacle body, the receptacle body having a mounting aperture for receiving a fastener and a contact pad with an access aperture extending therefrom, the mounting aperture, fastener, contact pad and access aperture cooperate to secure the connector in electrical engagement with the solar array;

the plug is configured to mate with the receptacle to form an electrical connection and wherein the plug and the receptacle have a vertical profile at least equal to a width of the cable.

2. The low profile connector of claim 1, wherein the plug body comprises at least one latch, the at least one latch being configured to engage with at least one ledge in the receiver and maintain electrical contact between the plug and the receptacle once the plug and receptacle are mated.

3. The low profile connector of claim 2, wherein the receptacle comprises at least one latch aperture, the at least one latch aperture being configured to provide access to the at least one latch when the plug is mated with the receptacle.

4. The low profile connector of claim 3, also comprising an extraction tool insertable in the at least one latch aperture in the receptacle to remove the plug from the receptacle once the at least one latch has engaged with the at least one ledge.

5. The low profile connector of claim 1, wherein the plug and the receptacle are manufactured from an overmolding process.

6. The low profile connector of claim 1, wherein the at least one latch produces at least one of an audible and tactile signal when the plug is mated with the receptacle.

7. The low profile connector of claim 1, wherein the contact pad is in electrical communication with the solar array through a solder connection.

8. The low profile connector of claim 7, wherein the receptacle body partially covers a bottom side of the contact pad.

9. The low profile connector of claim 1, wherein the receptacle is mechanically secured to the solar array with a staking process.

10. The low profile connector of claim 1, wherein the plug further comprises a strain relief configured to secure the cable to the plug body.

11. The low profile connector of claim 1, wherein the plug and the receptacle have a vertical profile that is greater than the diameter of the cable.

12. A low profile connector for mating to a solar array, the connector comprising:

a plug comprising a plug body, a male connection extending from a forward end of the plug body and a cable secured to the plug body; and a receptacle comprising a receptacle body and a receiver which extends from the receptacle body, the receptacle body having openings for receiving protrusions which secure the receptacle to the solar array through a staking process;

the plug is configured to mate with the receptacle to form an electrical connection and wherein the plug and the receptacle have a vertical profile that is at least equal to a width of the cable.

13. The low profile connector of claim 12, wherein at least one of an audible and tactile signal are produced when the plug is mated with the receptacle.

14. A low profile connector assembly for mounting to at least two solar arrays, the connector assembly comprising:

at least two plugs, each plug of the at least two plugs comprising a plug body, a male connection extending from a forward end of the plug body and a cable secured to the plug body; and at least two receptacles, each receptacle of the at least two receptacles comprising a receptacle body and a receiver which extends from the receptacle body, the at least two receptacles having mounting apertures for receiving fasteners therein and contact pads with access apertures extending therefrom, the mounting apertures, fasteners, contact pads and access apertures cooperate to secure the connectors in electrical engagement with the at least two solar arrays;

the at least two plugs are connected by the cable, and a first plug of the at least two plugs is configured to mate with a first receptacle of the at least two receptacles and a second plug of the at least two plugs is configured to mate with a second receptacle of the at least two receptacles and the first receptacle is configured to be secured in electrical contact with a first solar array and the second receptacle is configured to be secured in electrical contact with a second solar array and the at least two plugs and at least two receptacles are in electrical communication.

15. The low profile connector assembly of claim 14, wherein the at least two plugs and at least two receptacles have a vertical profile at least equal to a width of the cable.

16. The low profile connector assembly of claim 14, wherein at least one of an audible and tactile signal are produced when the at least two plugs are mated with the at least two receptacles.

17. The low profile connector assembly of claim 14, wherein the plug further comprises a strain relief configured to secure the cable in the at least two plugs.

* * * * *